United States Patent [19]
Fagen

[11] 3,811,576
[45] May 21, 1974

[54] UNIVERSAL ENGINE HEAD LIFT

[76] Inventor: John Fagen, 2318 W. 4th Ave., Kennewick, Wash. 93336

[22] Filed: Feb. 14, 1973

[21] Appl. No.: 332,364

[52] U.S. Cl. ............................ 212/35 R, 212/57
[51] Int. Cl. ........................................ B66c 23/54
[58] Field of Search ........ 212/35 R, 34, 57, 33, 59, 212/145

[56] References Cited
UNITED STATES PATENTS
| | | | |
|---|---|---|---|
| 2,774,483 | 12/1956 | Raymond | 212/35 R |
| 2,699,875 | 1/1955 | Stratton | 212/35 R |
| 2,998,143 | 8/1961 | Sundin | 212/35 R |

Primary Examiner—Richard A. Schacher
Assistant Examiner—H. S. Lane
Attorney, Agent, or Firm—Gilbert L. Wells, Kraft & Wells

[57] ABSTRACT

A universal engine head lift having a rectangular base for insertion under the front wheel of an automobile to be worked on, a tubular upright and a two-component boom with a hook for engaging the head of an automobile at the end thereof. The tubular upright has a tire clamp for stabilizing the assembly and truck wheels and a dolly are provided for transporting the assembly. Three hydraulic cylinders with respective control valves determine the angle of the boom and the height and lifting of the boom. Parallel manual and motor actuated hydraulic systems are provided for supplying hydraulic pressure to the cylinders.

8 Claims, 5 Drawing Figures

UNIVERSAL ENGINE HEAD LIFT

BACKGROUND OF THE INVENTION

The field of the invention is traversing hoists, particularly rotary cranes having a fixed radius and a vertically movable jib. The invention is particularly concerned with automobile cylinder head hoists.

The state of the art of automobile cylinder head hoists may be ascertained by reference to U. S. Pat. Nos. 2,859,881 of Coryell and 2,858,946 of Breed.

SUMMARY OF THE INVENTION

The present invention differs from the prior art in that the hydraulic members are more efficient since they permit a straight lift with the two piece boom and either an electric or hand pump may be used. The electric motor lifts out of the assembly for remote work on the road. It is also possible to bring the work closer to the base of the boom and this provides better security around the wheel.

The present invention is a universal engine head lift having a rectangular base for insertion under the front wheel of an automobile to be worked on, a tubular upright and a two-component boom with a hook for engaging the head of an automobile at the end thereof. The tubular uprights has a tire clamp for stabilizing the assembly and truck wheels and a dolly are provided for transporting the assembly. Three hydraulic cylinders with respective control valves determine the angle of the boom and the height and lifting of the boom. Parallel manual and motor actuated hydraulic systems are provided for supplying hydraulic pressure to the cylinders.

BRIEF DESCRIPTION OF THE DRAWINGS

The universal engine head lift of the present invention may best be explained by reference to the drawings, wherein.

Figure 1:
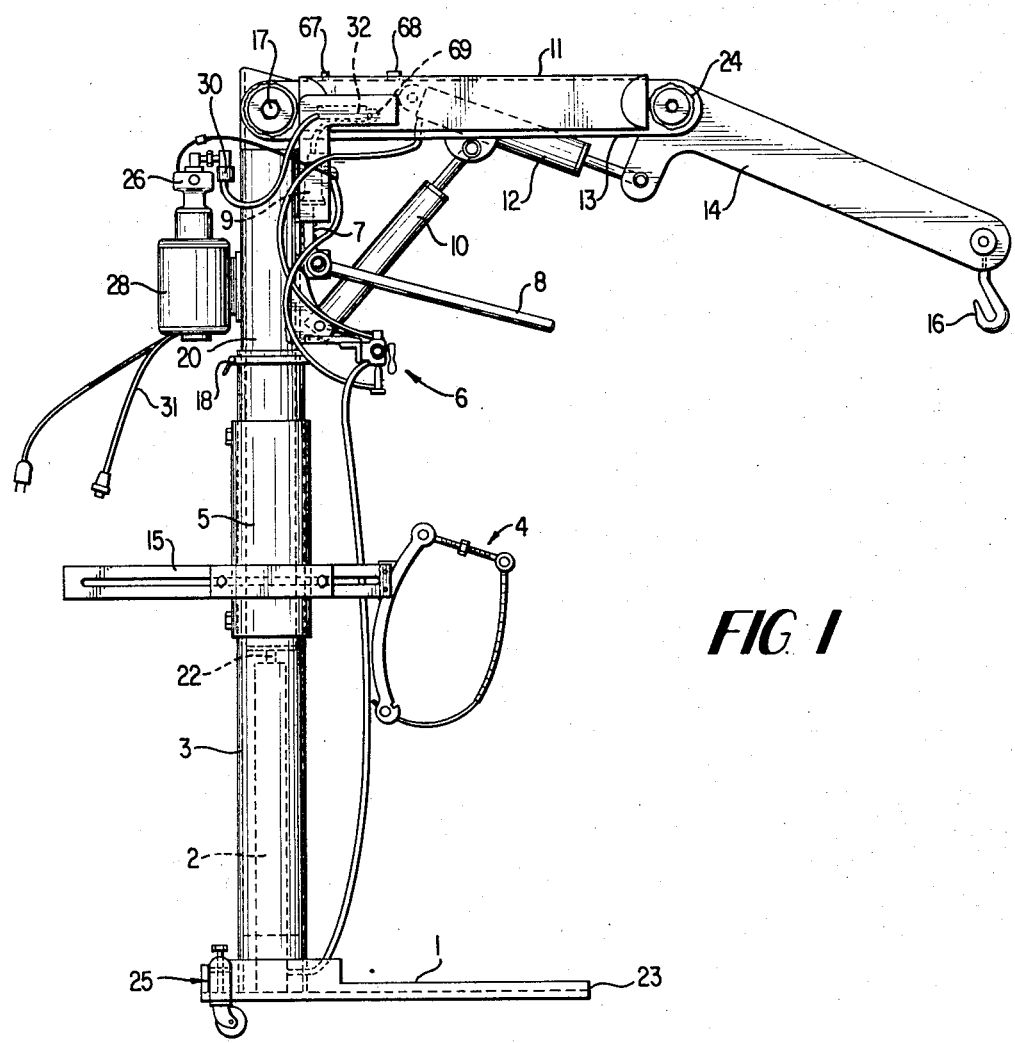
FIG. 1 is a side elevation view of the universal engine head lift.

With particular reference to FIG. 1, the universal engine head lift has a rectangular base 1 having a vertical tubular upright 3 attached thereto and a hydraulic cylinder 2 inside the tubular upright. The piston of the hydraulic cylinder 2 lifts vertical bar 20 which is connected to pivoting joint 17. A thrust bearing 22 is located between the head of the cylinder 2 and the base of the vertical bar 20. Clamping ring 18 at the head of the upright 3 can be used to hold the vertical bar 20 at a given elevation.

Vertically adjustable sleeve 5 surrounds upright 3 and has mounted thereon horizontally adjustable bar 15 with automobile tire clamp 4 at one end thereof.

Horizontal bar 13 is pivoted about pivoting joint 17 by the action of hydraulic cylinder 10 which in turn is pivoted at one end on bar 13 and at the other end on vertical bar 20.

At the other end of bar 13 from pivot 17 there is a second Zerk fitting type pivot 24 having L-shaped arm 14 pivoted thereabout. Hydraulic cylinder 12 is pivoted at the cylinder end on bar 13 and the piston thereof is connected at the end of the base of arm 14. A swivel hook 16 is connected to arm 14 at the end opposite pivot 24.

The cylinders 10 and 12, which activate the two-piece boom 11 and 14, and the lifting cylinder 2 are actuated by parallel hydraulic systems one of which is manual and the other motor actuated. The cylinder to be actuated is controlled by value assembly 6. Hydraulic pump 9 is pressurized by rack 7 and handle 8. Handle 8 is spring loaded at the pivot so that it can be removed and also adjusted for different positions. Hydraulic pump 26 is actuated by an electric motor 28 which is suitably a 110 volt current or can be replaced for a 12 or 24 volt starter motor operated by batteries. The hydraulic line to the pump 26 has quick disconnects 30 and 32 and the motor 28 may be lifted out of its mount so that the lift may be used manually at a location remote to an electrical source. Current to motor 28 is switch controlled by electrical cord 31 having an on/off at the end thereof.

Truck wheel assembly 25 is mountable at the rear of the base 1 for easy movement of the lift on the floor.

Figure 2:
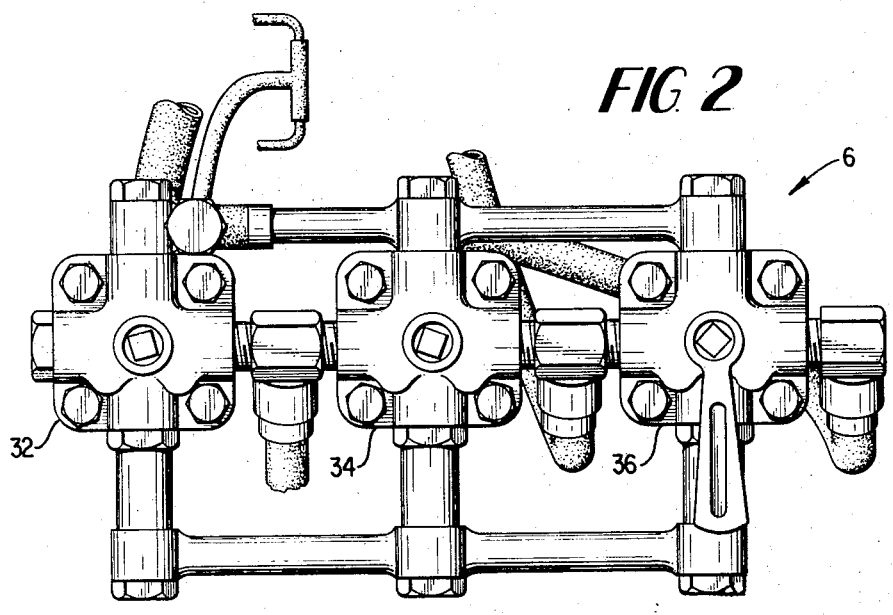
FIG. 2 is a detail view in front elevation of the valve assembly 6 of FIG. 1.
Figure 5:
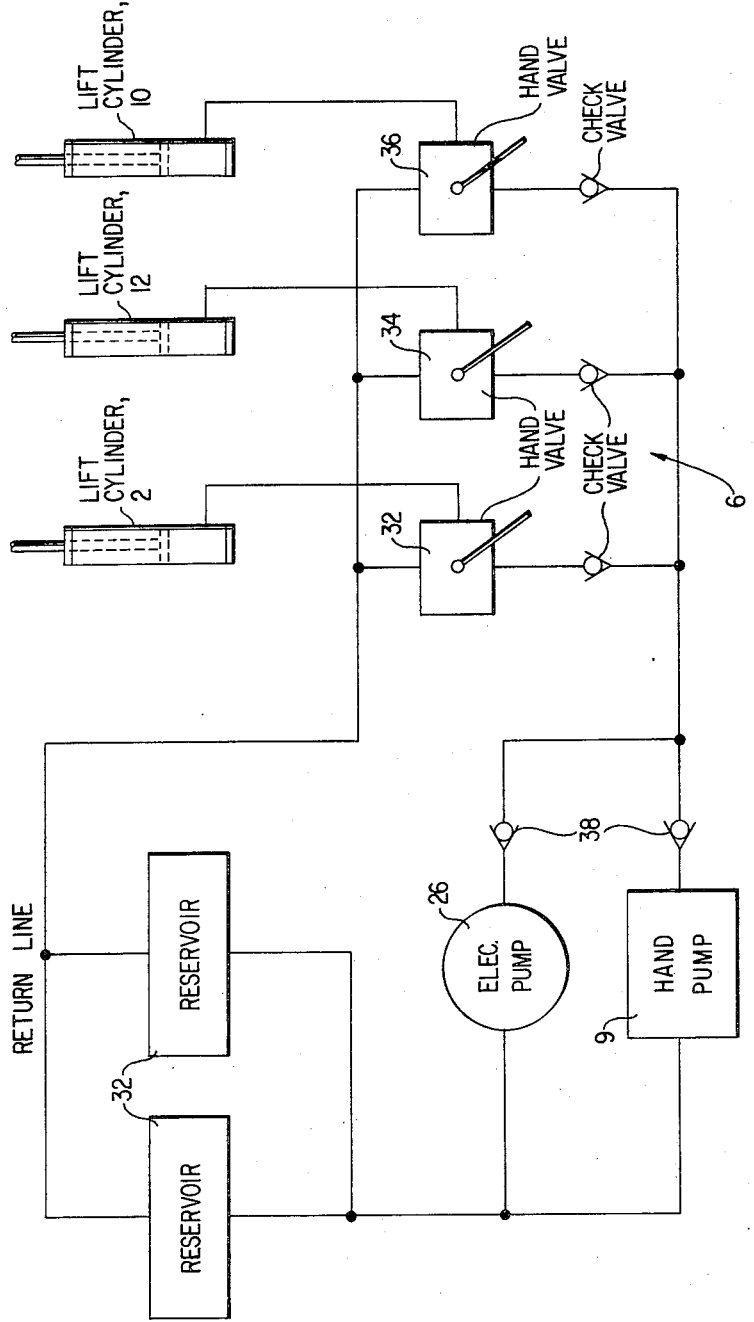
FIG. 5 is a schematic plan view of the hydraulic circuit used in the lift of FIG. 1.

The operation of the hydraulic system is best described by reference to FIGS. 2 and 5. Hydraulic fluid from the reservoir 32 is fed under pressure to the valve assembly 6. Hand operated control valve 32 controls cylinder 2 while valves 34 and 36 control cylinders 12 and 10 respectively. Check valves 38 are located in the lines from pumps 9 and 26 to allow for independent operation of the pumps.

Figure 3:
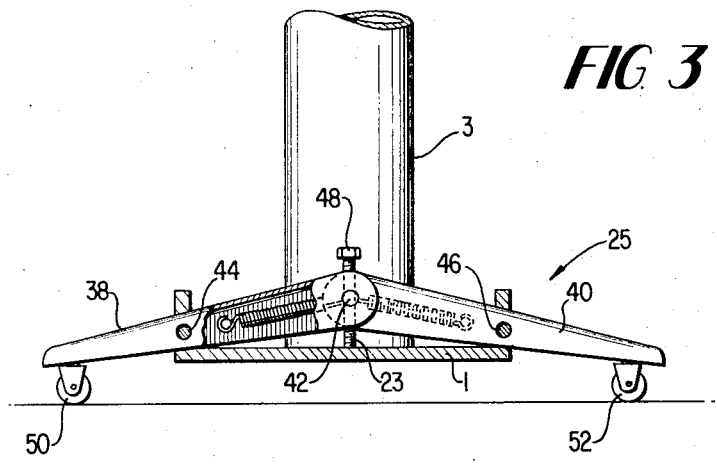
FIG. 3 is a side elevation view of the truck wheels shown mounted at the left side of the lift base of FIG. 1.

The truck wheels 25 are illustrated in detail in FIG. 3. Base members 38 and 40 are pivoted at 42 and have bolt holes 44 and 46. Screw 48 is mounted at the pivot 42 and dolly wheels 50 and 52 are mounted at the ends of the base members. The truck wheels 25 are mounted on the lift at the end of base 1 by securing pins or screws through holes 44 and 46 into the base 1. Base 1 has lip 23 and after securing the truck wheels to base 1 the clearance with the floor is established by actuating screw 48 which presses against lip 23. The truck wheels 25 are used when the lift is not on a dolly and permit the operator to tilt the lift back slightly so it can be moved to another location. The truck wheels also help to prevent the lift from tipping sideways.

Figure 4:
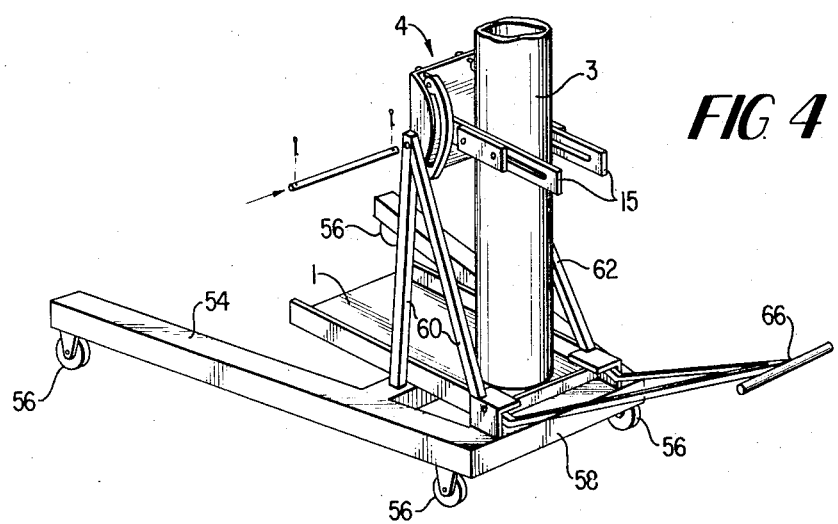
FIG. 4 is a perspective view of a dolly with the base of the lift of FIG. 1 mounted thereon.

When greater movement is required, the lift is mounted on the dolly shown in FIG. 4. This dolly has a truncated A-shaped base 54 with four wheels 56 mounted thereunder. The base is closed at one end by a plate 58. Mounted on this plate are vertical conduit stabilizers 60 and diagonal conduit stabilizers 62. A fastener 64 is mounted at the terminus of the stabilizers. A handle 66 is attached to the dolly for handling. The base 1 is mounted on the dolly by tilting it back on truck wheels 25 and by inserting the other end of the base into the open end of the dolly so that the base 1 rests on plate 58. The fastener 64 is connected to the tire clamp 4.

In operation the lift is transported to place to be used on the dolly. After arrival, the lift is removed from the dolly and tilted into position by truck wheels 25. The base 1 is suitably inserted under a front wheel of the automobile requiring the engine head to be removed. Tire clamp 4 is secured to the top of the automobile tire in order to further stabilize the lift. The height of the tire clamp is adjusted by sleeve 5.

The height of the boom 13 and 14 is adjusted by valve 32 and the angle of the boom is adjusted by valves 34 and 36. Hook 16 is secured to the engine head and the head is then lifted by a further action of valve 32.

I claim:

1. In a hoist for use in conjunction with vehicles having a plurality of wheels, said hoist having an upright mast, means for clamping one of said wheels adjustably mounted on said upright mast, a boom secured to and extending outwardly from said upright mast, and a base attached to the bottom of said upright mast, said base being rectangular for insertion under a wheel of said vehicles, the improvement comprising:
  a. means for extending the height of said upright mast; and
  b. means for extending the length and angle of said boom.

2. The hoist of claim 1 wherein said means for extending the height is a two-piece telescoping mast with a first hydraulic cylinder therein.

3. The hoist of claim 2, wherein said means for extending the length and angle are a two-piece boom pivoted at the top of said mast and at the middle with a second hydraulic cylinder actuating a first portion of said boom and a third hydraulic cylinder actuating a second portion of said boom.

4. The hoist of claim 3 having a manually actuated hydraulic system for pressurizing said hydraulic cylinders.

5. The hoist of claim 3 having a motor actuated hydraulic system for pressurizing said hydraulic cylinder.

6. The hoist of claim 5 having a three-way valve for actuating said hydraulic cylinders independent of one another.

7. The hoist of claim 1 having removable truck wheels for attachment to said base.

8. The hoist of claim 1 mounted on a dolly, said dolly having a truncated A shape and means for securing said hoist for transporting

* * * * *